Dec. 25, 1951 H. H. HENRY 2,579,573
BICYCLE BRAKE CONSERVING DEVICE
Filed May 6, 1949
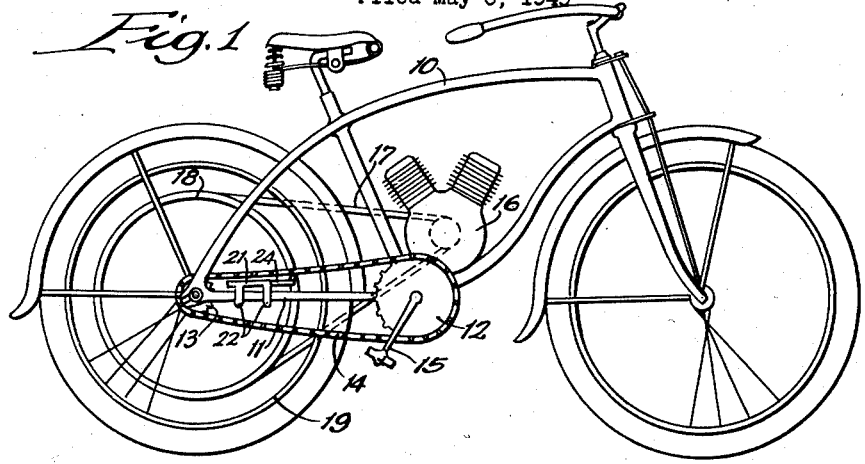
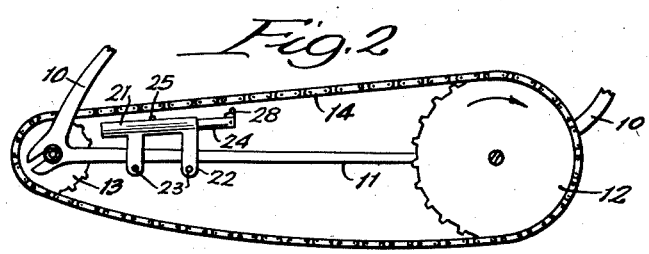
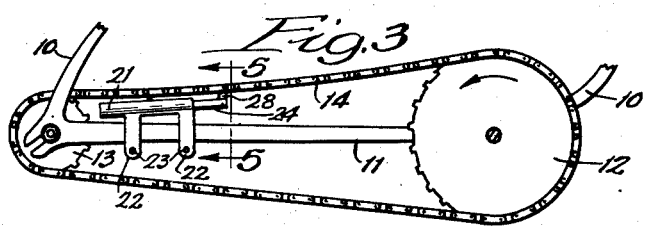
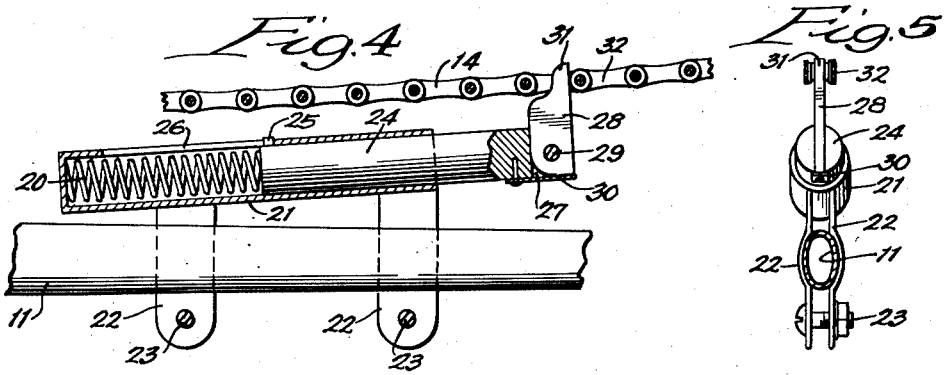
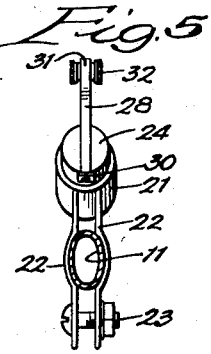
INVENTOR:
Harry H. Henry,
BY Dawson, Orme, Smith and Spangenberg,
ATTORNEYS.

Patented Dec. 25, 1951

2,579,573

UNITED STATES PATENT OFFICE 2,579,573

BICYCLE BRAKE CONSERVING DEVICE

Harry H. Henry, Chicago, Ill., assignor to Monark Silver King, Inc., Chicago, Ill., a corporation of Delaware Application May 6, 1949, Serial No. 91,815

5 Claims. (Cl. 192—5)

This invention relates to a bicycle brake-servicing device. The invention is particularly useful in connection with the bicycle or motor-driven bicycle in protecting the coaster brake against excessive wear.

In the use of bicycles, and especially motor-propelled bicycles, there is a tendency for children and others to use the brake excessively, the brake being applied too frequently and often almost unconsciously by the riders. This so-called "riding the brake" causes a premature breakdown of the brake, and the habit of almost constant application by children is one that is extremely difficult to break.

An object of the present invention is to provide means for automatically setting up resistance to the application of the brakes when an effort is made to apply the brakes, the predetermined resistance being insufficient, however, to prevent the application of the brakes when such braking effort is necessary. Yet another object is to interpose a yieldable resistance between the first step toward the applying of the brakes and the actual application of the brakes, whereby the rider is cautioned against the application of the brakes, and the brakes are not applied unless such application is required. A still further object is to provide a structure in which the slackening of the chain carried by the sprockets and during the initial step toward the applying of brakes is utilized as a means for connecting the chain with a compression spring for resisting the further backward movement of the chain in the application of the brakes. Other specific objects and advantages will appear as the specification proceeds.

The invention is illustrated, in a single embodiment, by the accompanying drawing; in which—

Figure 1 is a side view in elevation of a bicycle equipped with a resistance device embodying my invention; Fig. 2, a broken side view in elevation of the chain and sprocket structure and the resistance device for co-acting therewith, the chain being shown in driving position; Fig. 3, a view similar to Fig. 2 but showing the upper portion of the chain in slack position due to the reverse movement of the front sprocket for initiating the application of the brakes; Fig. 4, an enlarged detail sectional view of a portion of the structure shown in Fig. 3; and Fig. 5, a detail sectional view, the section being taken as indicated at line 5—5 of Fig. 3.

In the illustration given, 10 designates a bicycle frame provided with a rear fork member 11. The bicycle is provided with the usual drive sprocket 12 and driven sprocket 13, and a chain 14 connects the sprockets. The drive sprocket 12 is provided with the usual pedals 15. The bicycle may be used with or without a motor. If it is desired to equip the bicycle with a motor, a motor such as 16, equipped with a drive member 17 engaging a driven pulley 18 on the rear wheel 19 of the bicycle, may be employed. If desired, the motor may drive the rear wheel by providing a driven member in contact with the tire, or by driving any other member carried by the rear wheel. It will be understood that for the purposes of this invention any power means for driving the bicycle may be used. Further, as stated above, the power means may be entirely omitted.

My invention contemplates the interposing of a resistance to the application of the brake, the resistance being made effective upon the initial movements required for the application of the brake. The resistance prevents the application of the brake until a predetermined pressure is applied, which overcomes the interposed resistance. It will be understood that the resistance may be interposed at a variety of points. I have found that one very convenient means for applying the resistance is to secure a compression spring upon the rear fork 11, with means for actuating the same supported in a position for engagement with the chain when the chain is made slack in the application of the brakes. In the specific illustration given, I provide a compression spring 20 housed within a cylinder 21. The cylinder 21 is equipped with clamping spring legs 22 adapted to extend about the fork 11 and to be secured thereto by bolts 23. A plunger 24 is mounted in the cylinder 21 and may be provided with a stop lug 25 which extends through a slot 26 in the upper portion of the cylinder 21 so as to limit the movement of the plunger.

The forward end of the plunger 24 is provided centrally with a slot 27 in which is mounted an actuating lever 28 pivotally mounted within the slot by the pin 29. A spring 30, which is secured to the lower end of the plunger 24 by a screw or by welding, etc., may be employed to maintain the lever yieldingly in the vertical position shown best in Fig. 5. Preferably, the upper end of the lever is provided with a tooth 31 adapted to extend through the hollow portion of the chain length 32 when the chain is brought to the slack position illustrated in Figs. 3, 4 and 5.

Operation

In the operation of the bicycle, the drive sprocket 12 normally keeps the upper chain length in the taut position illustrated in Fig. 2, so that the chain lies well above the actuating lever 28. There is thus no interference with the normal propelling operation of the bicycle. When, however, it is desired to apply the coaster brake 33 carried upon the shaft 34 of the rear sprocket 13, a backward pressure upon the pedal arm 15 is brought about in the usual way, and this causes a slack in the upper portion of the chain 14, as illustrated best in Figs. 3, 4, and 5. The chain thus drops into engagement with the actuating lever 28, and the backward movement of the chain causes a corresponding backward movement of the lever 28 and plunger 24, thus compressing the spring 20. There is thus interposed between the initial movement for the actuation of the brake and the final application thereof, a spring resistance which may be set for any predetermined amount. Continued pedal pressure for the application of the brake will set the brake and the spring 20 yields sufficiently for this purpose.

The spring resistance shown overcomes the tendency of the rider to apply the brake with great frequency and without thought and thereby eliminates the excessive wear to which the brake has heretofore been subjected. When the rider is about to apply pressure, he is cautioned by the resistance against the application of pressure unless it is really desired to set the brake. The holding of the pedal in brake-applying position and the slacking of the upper length of the chain 14 enables the rider to apply the brake quickly, if necessary, but prior to such time when the application of the brake becomes necessary, he is given a range of action in which the brake is not applied even though the weight of his foot is resting upon the pedal in brake-applying position.

After the compression device has been used, as shown in Figs. 3 to 5 inclusive, movement of the sprocket 12 in the forward direction illustrated in Fig. 2, again lifts the upper length of the chain 14 so as to clear the actuating lever 28. In the clearing movement, the lever 28 is permitted by spring 30 to swing a short distance to facilitate the disengagement. The pressure of spring 30 immediately restores the lever 28 to the vertical position shown best in Fig. 4.

Instead of employing the spring resistance shown for engagement with the chain 14, it will be understood that other structures providing for the interposition of resistance upon the initial step toward the application of the brake may be employed.

While, in the foregoing specification, I have set forth a specific structure in considerable detail for the purpose of illustrating one embodiment of my invention, it will be understood that such details of structure may be varied widely by those skilled in the art without departing from the spirit of my invention.

I claim:

1. In combination with a bicycle having a frame, driving and driven sprockets, a coaster brake associated with said driven sprocket, a chain connecting said sprockets and pedal arms connected to said driving sprocket, a cylinder detachably mounted on said frame below the upper portion of said chain, a compression spring in said cylinder, a plunger in said cylinder engageable with the forward end of said compression spring, and an actuating lever carried by the forward end of said plunger and engageable with said chain when the chain is slackened in the initial movement for the application of the brake.

2. In combination with a motor driven bicycle having a frame, driving and driven sprockets, the driving sprocket being equipped with pedal arms, a brake associated with the driven sprocket and a chain connecting said sprockets, a cylinder detachably mounted on said frame below the upper length of said chain, a compression spring within said cylinder, a plunger mounted in said cylinder and having a portion extending freely from the forward end thereof, and a pivotally-mounted lever mounted upon the forward end of said plunger for engagement with said chain when the same is slackened in the initial steps for application of the brake whereby said spring is compressed prior to the setting of the brake.

3. In combination with a bicycle having a frame providing a rear fork member, a driving sprocket equipped with pedal arms, a driven sprocket, a coaster brake connected to said rear sprocket and a chain connecting said sprockets, a cylinder detachably mounted upon said rear fork member, a compression spring housed in said cylinder, a plunger reciprocal in said cylinder for engagement with said spring to compress it, said plunger having a portion extending forwardly of said cylinder and being provided with a vertical slot, a lever mounted in said slot and having a tooth adapted to engage the upper portion of said chain when the same is slackened in the initial brake-applying operation, and spring means normally maintaining said lever in a vertical position for engagement with said chain.

4. In combination with a bicycle having a frame, a pedal arm equipped driving sprocket, a driven sprocket, a coaster brake connected to said driven sprocket and a chain connecting said sprockets, a casing releasably secured upon said frame below the upper portion of said chain and providing a cylinder, a compression spring mounted in said cylinder, a plunger engaging said spring and slideably mounted therein, cooperating means on said plunger and casing for limiting the longitudinal movement of said plunger, and means carried by the forward end portion of said plunger for engaging the upper portion of said chain when said chain is slackened and moved rearwardly in the brake-applying operation.

5. In a bicycle equipped with a coaster brake operated by reversing the normal motion of the driving chain over the pedal and wheel sprockets and also having a frame member adjacent the path of movement of said chain between said sprockets, a device for conserving said coaster brake, comprising a cylinder equipped with legs adapted to be clamped about said frame member to position said cylinder in alignment with the path of movement of said chain, a combination spring within said cylinder, a plunger mounted in said cylinder in compressing engagement with said spring and having a portion extending freely from the forward end of said cylinder, and a lever pivotally mounted upon the forward end of said plunger, said lever being spring biased to normally extend laterally from said plunger toward the path of movement of said chain and provided with stop means for limiting the rearward rotation of said lever, whereby the reversing of the normal motion of said chain in the initial steps for applying of the brake slackens said chain and thereby engages said chain and said lever so that said spring must be compressed prior to the setting of the brake.

HARRY H. HENRY.

REFERENCES CITED

The following references are of record in the file of this patent:

UNITED STATES PATENTS

| Number | Name | Date |
|---|---|---|
| 1,440,017 | Koechlin | Dec. 26, 1922 |
| 2,222,075 | Johnston | Nov. 19, 1940 |
| 2,449,200 | Boucher | Sept. 14, 1948 |

FOREIGN PATENTS

| Number | Country | Date |
|---|---|---|
| 516,346 | Germany | Sept. 29, 1931 |
| 640,141 | Germany | Dec. 23, 1936 |
| 335,348 | France | Jan. 19, 1904 |
| 539,401 | France | June 26, 1922 |
| 571,617 | France | May 21, 1924 |
| 187,392 | Great Britain | Oct. 26, 1926 |